United States Patent
Oh

(10) Patent No.: US 12,134,408 B2
(45) Date of Patent: Nov. 5, 2024

(54) BIASED DRIVING SYSTEM AND BIASED DRIVING METHOD UTILIZING LANE AND ROAD SHAPE INFORMATION

(71) Applicants: Hyundai Motor Company, Seoul (KR); Kia Corporation, Seoul (KR)

(72) Inventor: Tae Dong Oh, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 432 days.

(21) Appl. No.: 17/521,090

(22) Filed: Nov. 8, 2021

(65) Prior Publication Data
US 2022/0234623 A1  Jul. 28, 2022

(30) Foreign Application Priority Data

Dec. 29, 2020 (KR) .................. 10-2020-0186460

(51) Int. Cl.
*B60W 60/00* (2020.01)

(52) U.S. Cl.
CPC ..... *B60W 60/0027* (2020.02); *B60W 2520/12* (2013.01); *B60W 2540/22* (2013.01); *B60W 2540/30* (2013.01); *B60W 2552/10* (2020.02); *B60W 2552/20* (2020.02); *B60W 2552/30* (2020.02); *B60W 2554/4041* (2020.02); *B60W 2554/4042* (2020.02); *B60W 2554/4043* (2020.02); *B60W 2554/4046* (2020.02); *B60W 2554/801* (2020.02); *B60W 2554/802* (2020.02); *B60W 2720/10* (2013.01); *B60W 2720/12* (2013.01)

(58) Field of Classification Search
None
See application file for complete search history.

(56) References Cited

U.S. PATENT DOCUMENTS

| | | | |
|---|---|---|---|
| 2018/0105170 A1* | 4/2018 | Nagae | B60W 30/12 |
| 2021/0300427 A1* | 9/2021 | Tao | G05D 1/0225 |
| 2021/0389153 A1* | 12/2021 | Zhen | B60W 30/12 |
| 2022/0063629 A1* | 3/2022 | Oh | B60W 40/04 |

* cited by examiner

*Primary Examiner* — Peter D Nolan
*Assistant Examiner* — Jacob Kent Besteman-Street
(74) *Attorney, Agent, or Firm* — Fox Rothschild LLP

(57) ABSTRACT

A biased driving system and a biased driving method are capable of controlling biased driving of a vehicle in consideration of host vehicle location recognition accuracy, nearby vehicle risk, driving style, road curvature, and road shape. The biased driving system includes a control parameter creation unit configured to extract an object causing biasing of a host vehicle using converged object information, which is map information including location and speed of a vehicle around the host vehicle, to create an imaginary line of the extracted object by reflecting at least one of risk of a nearby vehicle, location recognition accuracy, driving style of a driver of the host vehicle, road curvature, or road shape, and to create a control parameter using the imaginary line.

21 Claims, 21 Drawing Sheets

FIG. 4
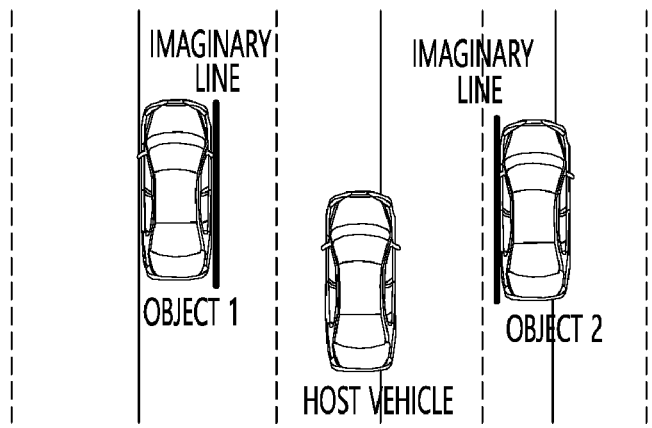
<OBJECT IMAGINARY LINE EXTRACTION
METHOD ON STRAIGHT ROAD>
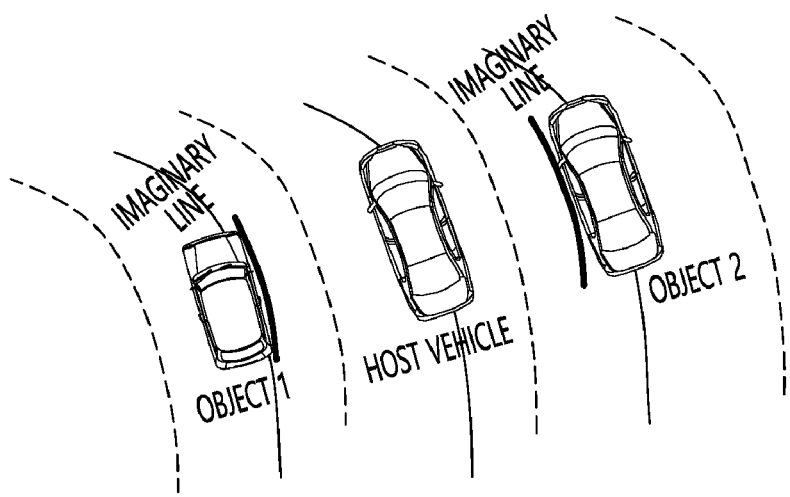
<OBJECT IMAGINARY LINE EXTRACTION
METHOD ON CURVED ROAD>

FIG. 9
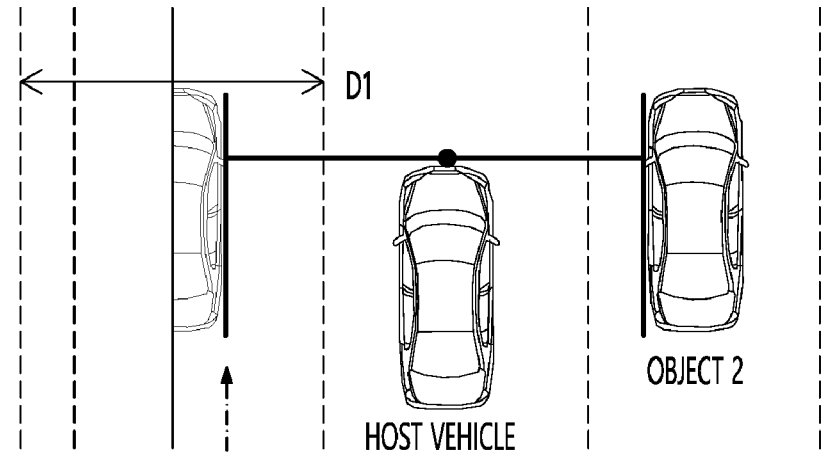
<SLIGHTLY BIASED>
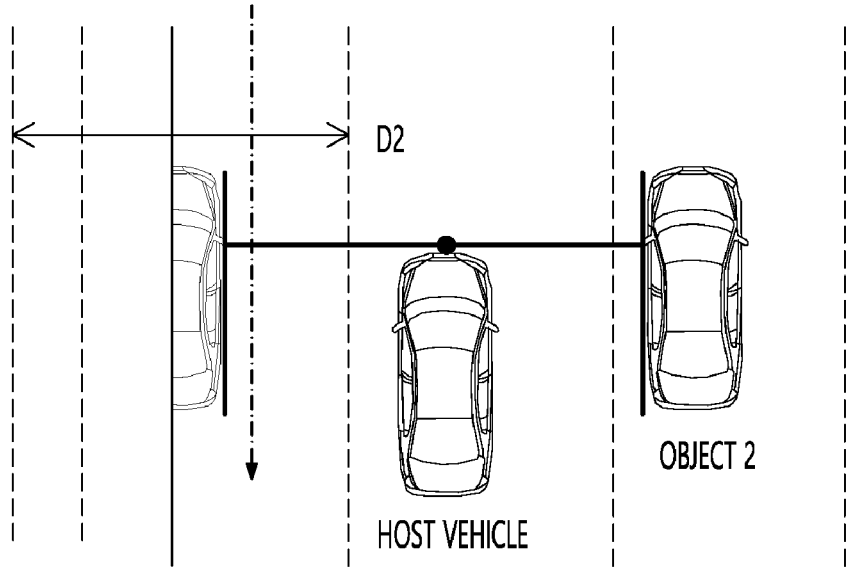
<GREATLY BIASED>

FIG. 10
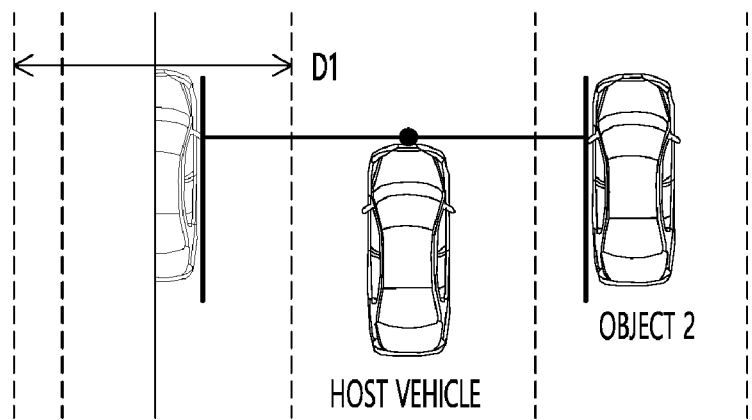
<VIRTUAL LANE WIDTH LEARNING BASED ON DRIVING STYLE>
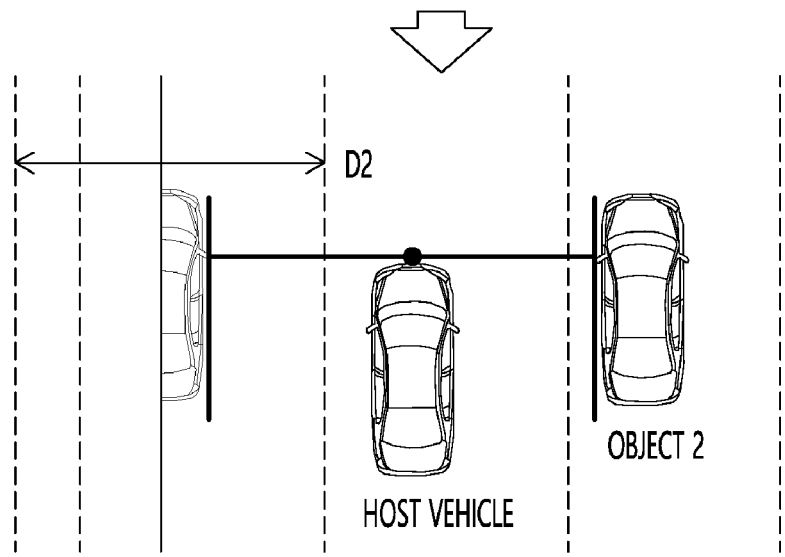
<BIASED DRIVING HAVING DRIVING STYLE REFLECTED THEREIN>

FIG. 13
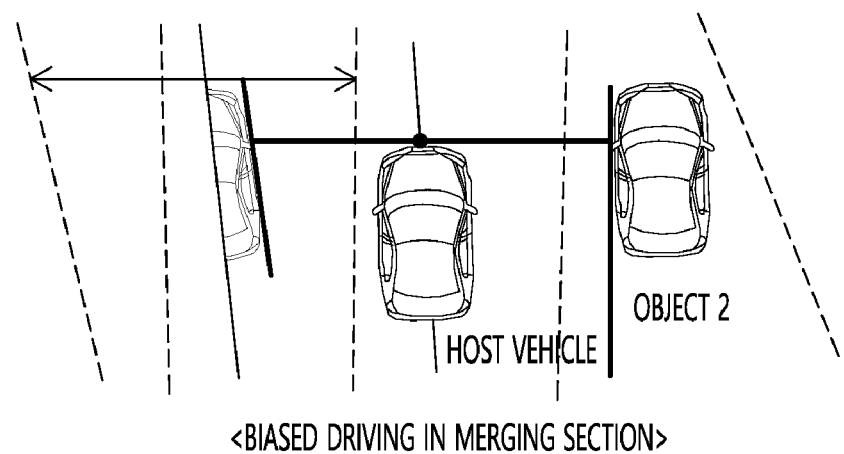
<BIASED DRIVING IN MERGING SECTION>
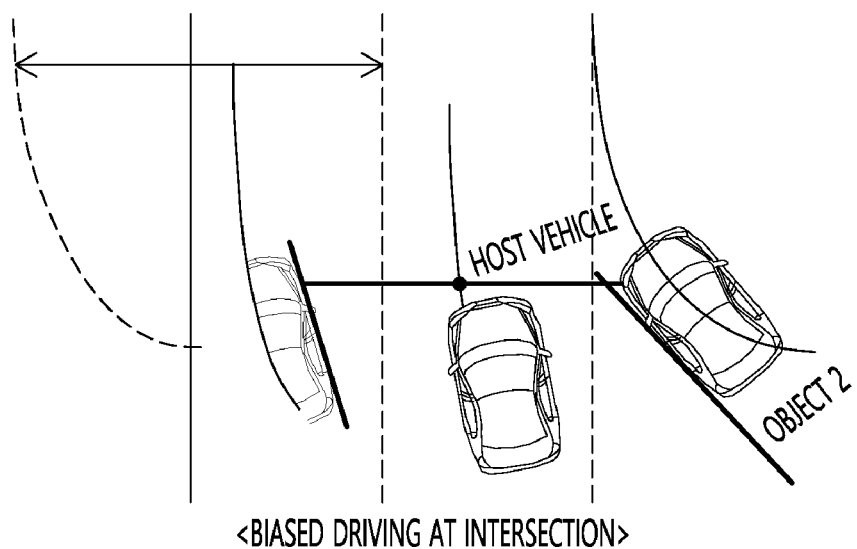
<BIASED DRIVING AT INTERSECTION>

BIASED DRIVING SYSTEM AND BIASED DRIVING METHOD UTILIZING LANE AND ROAD SHAPE INFORMATION

CROSS-REFERENCE TO RELATED APPLICATION

This application claims under 35 U.S.C. § 119(a) the benefit of Korean Patent Application No. 10-2020-0186460, filed on Dec. 29, 2020, the entire contents of which are incorporated by reference herein.

BACKGROUND

(a) Technical Field

The present disclosure relates to a biased driving system and a biased driving method, more particularly, to the biased driving system and the biased driving method utilizing lane and road shape information, and being capable of controlling biased driving of a vehicle in consideration of host vehicle location recognition accuracy, nearby vehicle risk, driving style, road curvature, and road shape.

(b) Description of the Related Art

Automatic acceleration and deceleration control technology and steering control technology based on a driving lane are required for automatic driving of a vehicle. In Korean Patent Application Publication No. 10-2019-0123663 published on Nov. 1, 2019, a driving route provision apparatus includes a sensor 110, a steering device 120, an input device 130, and a control circuit 140, and driving is performed in a driving lane, while lanes can be changed.

As disclosed in Korean Publication No. 10-2019-0123663, the sensor 110 acquires information about an external object, and the input device 130 receives a lane change command from a driver of a vehicle. The control circuit 140 performs control such that the vehicle drives along a biased route in a driving lane based on the information acquired from the sensor 110 and operation of the steering device 120. Upon receiving the lane change command through the input device 130 while the vehicle drives along the biased route in the driving lane, the control circuit 140 performs control such that a lane change is completed and then the vehicle drives along a biased route in a target lane.

A conventional biased driving apparatus controls driving of a vehicle by a method of determining a biased value using a safe distance between a host vehicle and a nearby vehicle as a parameter. When biased extent is determined in various situations, such as normal driving, lane change, and location of a vehicle at an intersection, therefore, a point of discontinuity in the biased value occurs, whereby biased control of the vehicle is not natural. In addition, many branch statements are input in determining the biased value, whereby complexity of biased value determination logic is increased, and host vehicle location recognition accuracy, nearby vehicle risk, and driving style of a driver cannot be reflected in the biased value.

Particular, in the case in which the biased value is determined based on lane violation extent, a host vehicle cannot react in advance even though approach of another vehicle is expected in a section having a narrow lane width.

SUMMARY

Accordingly, the present disclosure is directed to a biased driving system and a biased driving method that substantially obviate one or more problems due to limitations and disadvantages of the related art.

An object of the present disclosure is to provide a biased driving system capable of controlling biased driving of a vehicle in consideration of host vehicle location recognition accuracy, nearby vehicle risk, driving style, road curvature, and road shape.

Another object of the present disclosure is to provide a biased driving method capable of controlling biased driving of a vehicle in consideration of host vehicle location recognition accuracy, nearby vehicle risk, driving style, road curvature, and road shape.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a biased driving system includes a control parameter creation unit configured to extract an object causing biasing of a host vehicle using converged object information, which is map information including location and speed of a vehicle around the host vehicle, to create an imaginary line of the extracted object by reflecting at least one of risk of a nearby vehicle, location recognition accuracy, driving style of a driver of the host vehicle, road curvature, or road shape, and to create a control parameter using the imaginary line, and a controller configured to create a control value of a vehicle corresponding to the control parameter received from the control parameter creation unit in order to control biasing of the host vehicle.

In another aspect of the present disclosure, a biased driving method includes extracting a biased target object based on a biased section, extracting an imaginary line by reflecting a predetermined condition in a reference point to be biased and the extracted biased target object, grouping objects satisfying a predetermined criterion, among biased objects near a host vehicle, calculating a biased offset for each grouped object cluster, creating a biased route, which is a route on a lane link having the calculated offset reflected therein, creating a speed profile of the host vehicle that moves along the biased route, and creating a control parameter having the biased route and the speed profile reflected therein.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 illustrates operation of an object imaginary line extraction module;

FIG. 9 illustrates a method of reflecting location recognition accuracy when the object imaginary line extraction module sets an imaginary line;

FIG. 10 illustrates a method of reflecting driving style of a host vehicle driver when the object imaginary line extraction module sets an imaginary line;

FIG. 13 illustrates a method of reflecting road shape when the object imaginary line extraction module sets an imaginary line;

DETAILED DESCRIPTION OF THE DISCLOSURE

Figure 1:
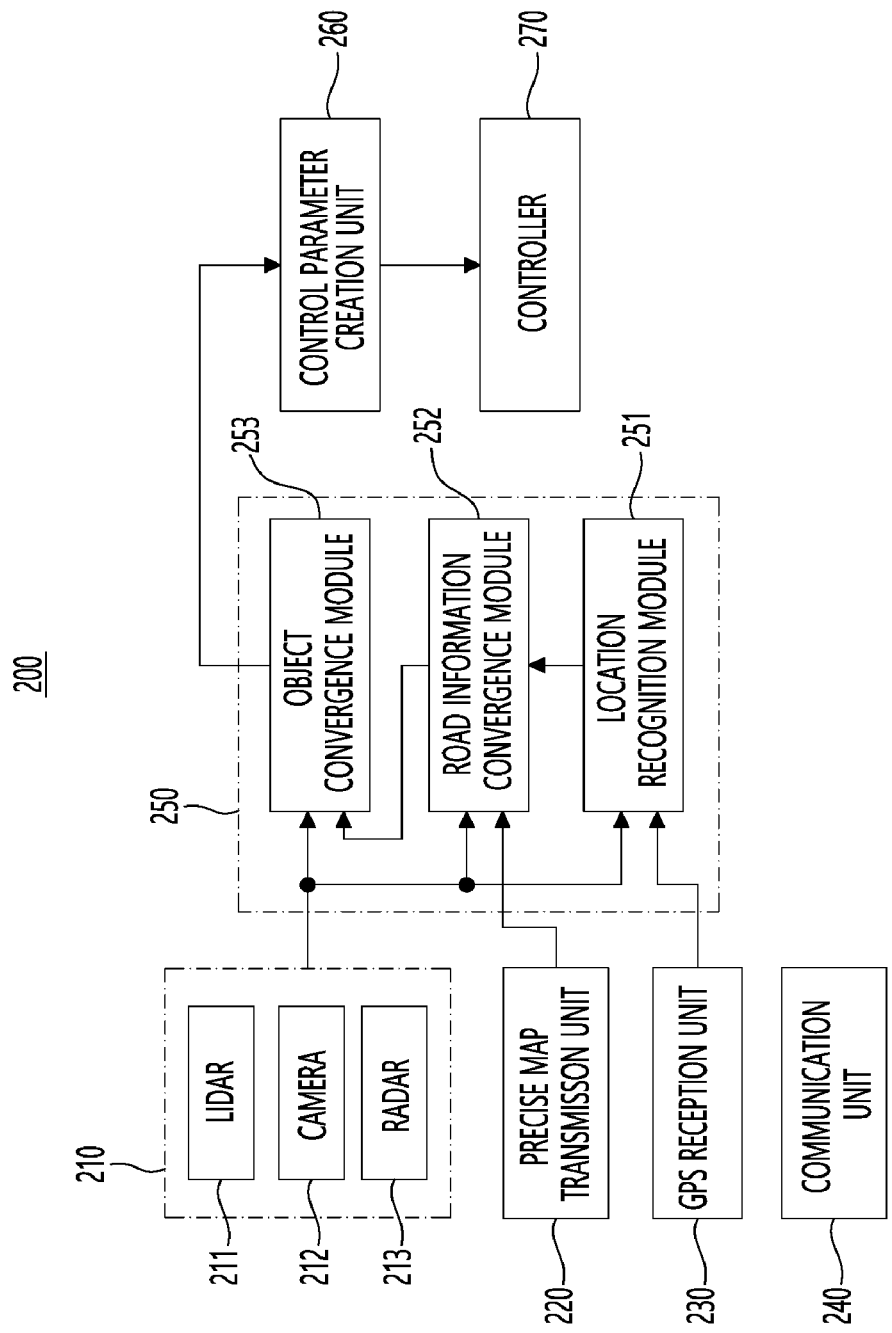
FIG. 1 shows an embodiment of a biased driving system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present disclosure, advantages in operation of the present disclosure, and objects achieved by implementation of the present disclosure, the accompanying drawings describing exemplary embodiments of the present disclosure and the contents stated in the accompanying drawings must be referred to.

Hereinafter, embodiments of the present disclosure will be described in detail with reference to the accompanying drawings. The same reference numerals in the respective drawings denote the same members.

FIG. 1 shows an embodiment of a biased driving system according to the present disclosure.

Referring to FIG. 1, the biased driving system according to the present disclosure (hereinafter referred to as a biased driving system) 200 includes a recognition sensor unit 210, a precise map transmission unit 220, a GPS reception unit 230, a communication unit 240, a biased object information creation unit 250, a control parameter creation unit 260, and a controller 270.

The recognition sensor unit 210 includes lidar 211, a camera 212, and radar 213, and collects a driving road, surrounding information of the driving road, and information about a nearby vehicle to create recognition information. The precise map transmission unit 220 provides a precise map around a vehicle equipped with the biased driving system 200.

The GPS reception unit 230 receives a signal from a GPS satellite (not shown) or calculates the current location of a host vehicle, i.e., a vehicle equipped with the biased driving system 200, using the received signal. The communication unit 240 is configured to transmit and receive information in the biased driving system 200 and between the biased driving system 200 and the outside.

The biased object information creation unit 250 includes a location recognition module 251, a road information convergence module 252, and an object convergence module 253.

The location recognition module 251 compares the recognition information received from the recognition sensor unit 210, the current location information of the host vehicle received from the GPS reception unit 230, and the precise map around the vehicle received from the precise map transmission unit 220 with each other to create current precise location information and location recognition reliability information of the host vehicle. The road information convergence module 252 creates a precise map around the host vehicle using the current precise location information of the host vehicle received from the location recognition module 251 and the precise map around the vehicle received from the precise map transmission unit 220. The object convergence module 253 creates converged object information using the precise map around the host vehicle received from the road information convergence module 252 and the recognition information. The converged object information is map information. Specifically, the converged object information is not simple map information but map information including location and speed of an object, i.e., a nearby vehicle other than the host vehicle.

The control parameter creation unit 260 creates a control parameter to be provided to the controller 270 using the converged object information received from the biased object information creation unit 250. The structure and function of the control parameter creation unit 260 will be described below.

The controller 270 creates a control value of the vehicle corresponding to the control parameter received from the control parameter creation unit 260 to control biasing of the vehicle.

Figure 2:
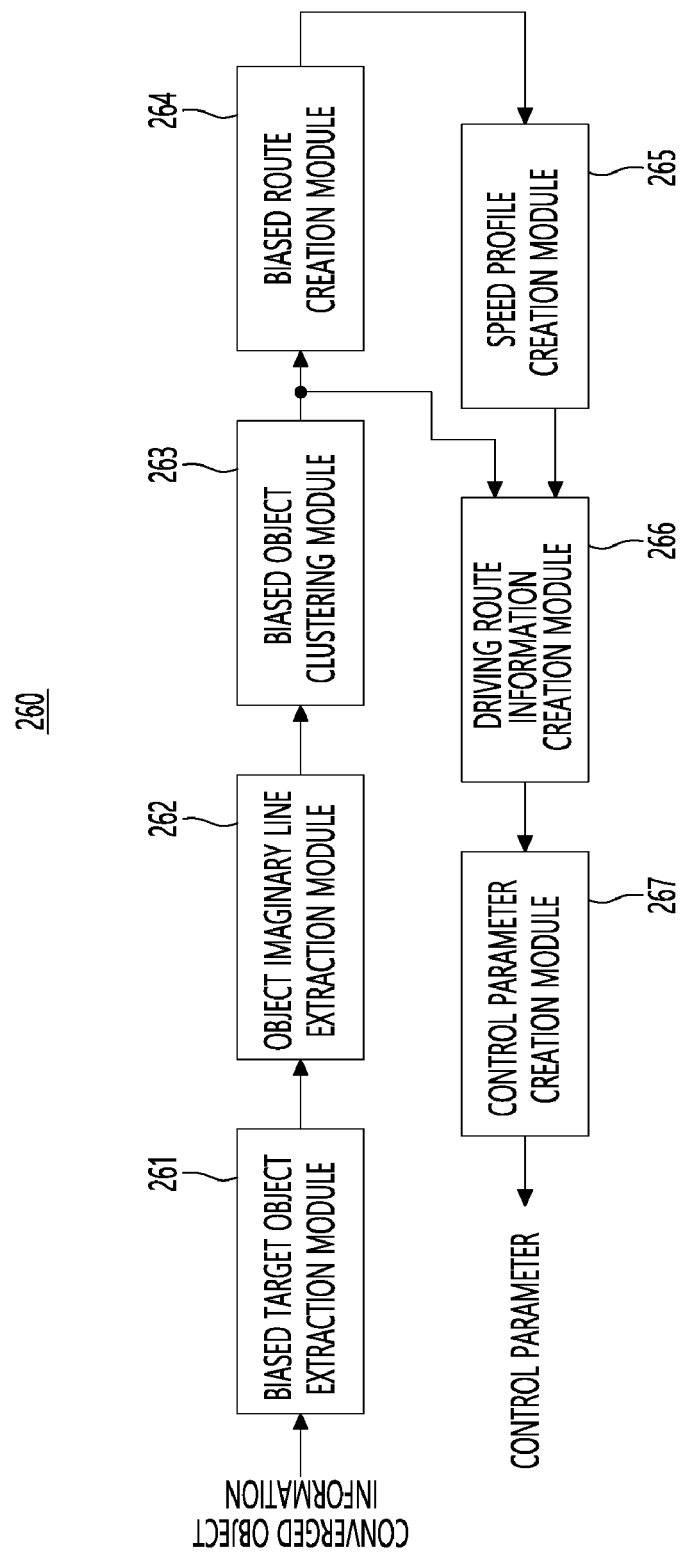
FIG. 2 shows an example of a control parameter creation unit.

FIG. 2 shows an example of the control parameter creation unit.

Referring to FIG. 2, the control parameter creation unit 260 includes a biased target object extraction module 261, an object imaginary line extraction module 262, a biased object clustering module 263, a biased route creation module 264, a speed profile creation module 265, a driving route information creation module 266, and a control parameter creation module 267.

First, contents related to input and output of each module will be briefly described, and the detailed function of each module will be described below.

The biased target object extraction module 261 extracts an object causing biasing of the host vehicle or a list of objects causing biasing of the host vehicle, among a plurality of objects included in the converged object information received from the biased object information creation unit 250. The object causing biasing of the host vehicle indicates a vehicle that has approached within a predetermined biased section D.

The object imaginary line extraction module 262 extracts an imaginary line of a biased target object for the object causing biasing of the host vehicle received from the biased target object extraction module 261 and extracts a central line of the host vehicle using the extracted imaginary line of the biased target object. Here, the imaginary line is an imaginary straight line (or curved line) parallel to the host vehicle lane based on the closest point between the outermost point of the target object and the host vehicle and is utilized as a reference line when biased. When extracting the central line using the imaginary line, the case in which objects are present at both sides of the host vehicle and the case in which an object is present at only one side of the host vehicle are distinguished from each other, and risk, location recognition accuracy, driving style of the host vehicle driver, road curvature, and road shape are reflected in each case.

The biased object clustering module 263 creates biased cluster information grouping biased target objects based on the imaginary line of the biased target object received from the object imaginary line extraction module 262 and predetermined criteria. The biased cluster information includes the number of clusters and information of each cluster, and is used to prevent creation of an unnatural biased route. Here, the criteria include a criterion based on the distance between vehicles, a criterion based on whether other vehicle zigzags, and a criterion based on expected lateral speed of the host vehicle.

The biased route creation module 264 creates a biased route, which is a set of final biased values, using the biased cluster information received from the biased object clustering module 263. Here, the biased route refers to a line that connects a central line between an imaginary line of a left lane closest to the host vehicle lane and an imaginary line of a right lane closest to the host vehicle lane and a lane link to each other in the cluster.

The speed profile creation module 265 creates speed profile information including the biased route received from the biased route creation module 264 and host vehicle speed information matched with road traffic situation.

The driving route information creation module 266 creates driving route information including the biased route received from the biased route creation module 264 and the speed profile information received from the speed profile creation module 265.

The control parameter creation module 267 creates a control parameter necessary to drive the host vehicle based on the driving route information created by the driving route information creation module 266.

Figure 3:
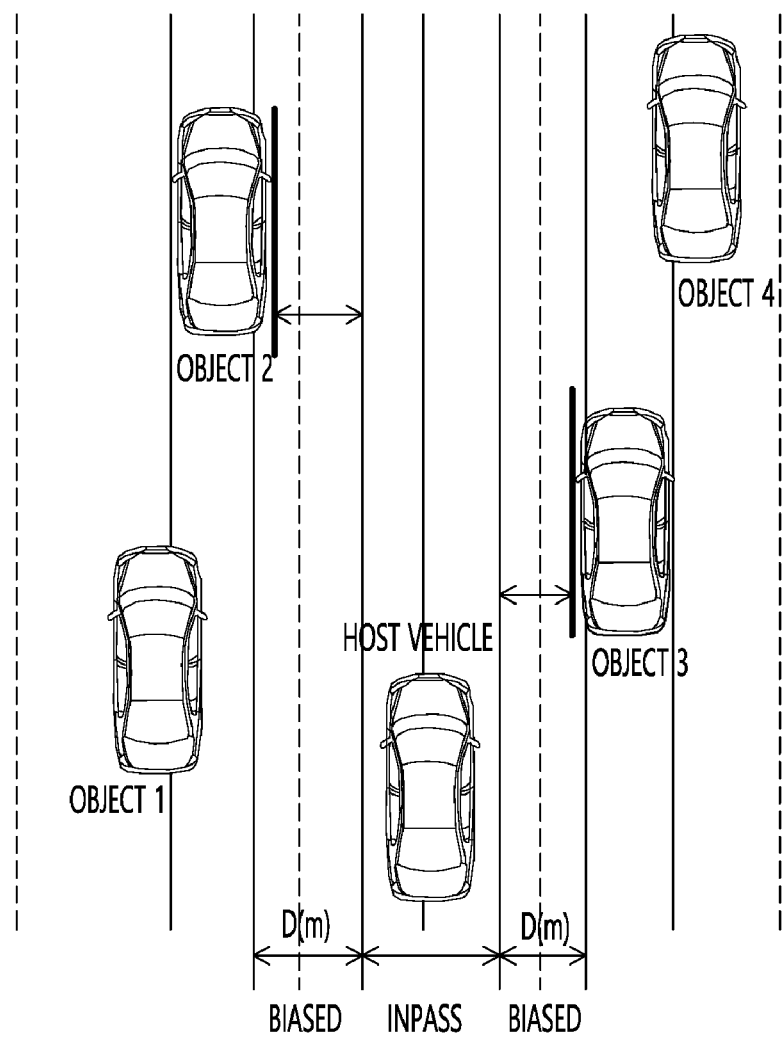
FIG. 3 illustrates operation of a biased target object extraction module.

FIG. 3 illustrates operation of the biased target object extraction module.

Referring to FIG. 3, it can be seen that the biased target object extraction module 261 includes two objects (object 2 and object 3) included in a biased section D(m) (m being meter), among a total of four objects located around the host vehicle, as biased target objects. The biased section D is variably set depending on lane width and lane properties.

As described above, location, speed, and map information of vehicles adjacent to the host vehicle (object 1 to object 4) are converged in the converged object information received by the biased target object extraction module 261. The width of a normal lane is about 3.5 m. For example, the distance of a vehicle having an overall width of about 2 m to a lane division line is about 50 cm in consideration of slight biasing. In the case in which the vehicle approaches within 30 cm, the vehicle threatens an opposite lane. Consequently, a section within 30 cm outside the lane division line of the host vehicle and a section that is not part of the lane division line of the host vehicle may be combined and set as the biased section D.

FIG. 4 illustrates operation of the object imaginary line extraction module.

Referring to FIG. 4, it can be seen that the object imaginary line extraction module 262 extracts imaginary lines of the biased target objects causing biasing of the host vehicle (object 1 and object 2) received from the biased target object extraction module 261 from a curved road as well as a straight road. As previously described, the biased target object is a target vehicle that the host vehicle must bias or a list of target vehicles that the host vehicle must bias.

In the case in which outputs of various sensors constituting the recognition sensor unit 210 are inaccurate and thus the contour line of the vehicle shakes, an embodiment of using an imaginary line obtained by performing parallel movement from the center of a rear bumper of the vehicle by a predetermined vehicle width is also possible.

In the case in which objects (hereinafter referred to as vehicles) are present in lanes at both sides of the host vehicle, it is preferable for the host vehicle to drive along the center between both vehicles. In this case, a central line may be calculated based on the outermost contour lines of both vehicles. In the case in which a vehicle is present in a lane at only one side of the host vehicle, a central line may be calculated on the assumption that the same vehicle is also present at an opposite side of the vehicle that is present in a state of being spaced apart therefrom by the same distance.

A method of obtaining two imaginary lines and a central line between the imaginary lines when vehicles are present in lanes at both sides of the host vehicle will be described first, and then a method of obtaining two imaginary lines and a central line between the imaginary lines when a vehicle is present in a lane at only one side of the host vehicle will be described.

Figure 5:
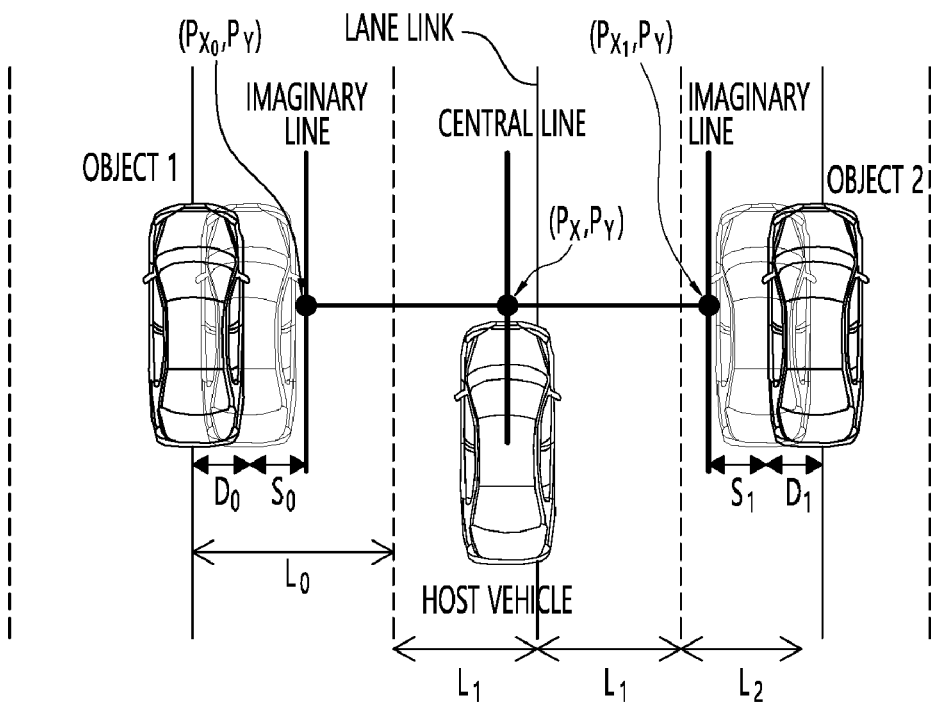
FIG. 5 shows an example of a method of obtaining imaginary lines and a central line when vehicles are present at both sides of a host vehicle.

FIG. 5 shows an example of a method of obtaining imaginary lines and a central line when vehicles are present at both sides of the host vehicle.

Referring to FIG. 5, it is clear that, when each of a left vehicle (object 1) and a right vehicle (object 2) drives along a central line thereof, a lane link and the central line coincide with each other. In the case in which both the left vehicle (object 1) and the right vehicle (object 2) are biased toward the lane of the host vehicle, however, it can be seen that an imaginary central line becoming the lane link that is corrected, i.e., the central point between the two vehicles (object 1 and object 2), is determined to be a point biased leftwards from the lane link by a predetermined distance due to the lane widths of the two vehicles depending on biased extent. The central line is biased toward an opposite side, i.e., leftwards, in careful consideration of the biased vehicle (object 2) in a section having a small lane width.

Effective biasing in an opposite direction may be ignored. That is, referring to FIG. 5, even though the width of the left lane is greater than the width of the right lane based on the lane of the host vehicle, biasing is reflected to an extent that is necessary without the host vehicle moving toward a corresponding lane indefinitely.

In the position $(P_{X_0}, P_Y)$ of the imaginary line of the left vehicle (object 1), the position $(P_X, P_Y)$ of the central line, and the position $(P_{X_1}, P_Y)$ of the imaginary line of the right vehicle (object 2), the X coordinate $(P_X)$ of the central line may be represented by Mathematical expression 1.

$$P_X = \frac{P_{X_0} + P_{X_1}}{2} = \frac{(-L_1 - L_0 + D_0 + S_0) + (L_1 + L_2 - D_1 - S_1)}{2} = \frac{(L_2 - L_0) + (D_0 - D_1) + (S_0 - S_1)}{2}$$ [Mathematical expression 1]

Here, $L_1$ indicates the distance between the lane link of the lane of the host vehicle and each lane division line, $L_0$ indicates the distance between the left lane division line of the host vehicle and the central line of the left vehicle, and $L_2$ indicates the distance between the right lane division line of the host vehicle and the central line of the right vehicle.

$D_0$ is the distance between the central line of the left lane and the right imaginary line of the left vehicle (object 1) when the left vehicle drives along the central line, and $S_0$ is the distance by which the vehicle assumed to drive along the central line of the left lane moves toward the lane of the host vehicle. $D_0$ may be half of the width of the left vehicle (object 1).

$D_1$ and $S_1$ are for the right vehicle (object 2) located in the right lane, and concepts applied to the left vehicle (object 1) are equally applied thereto.

Figure 6:
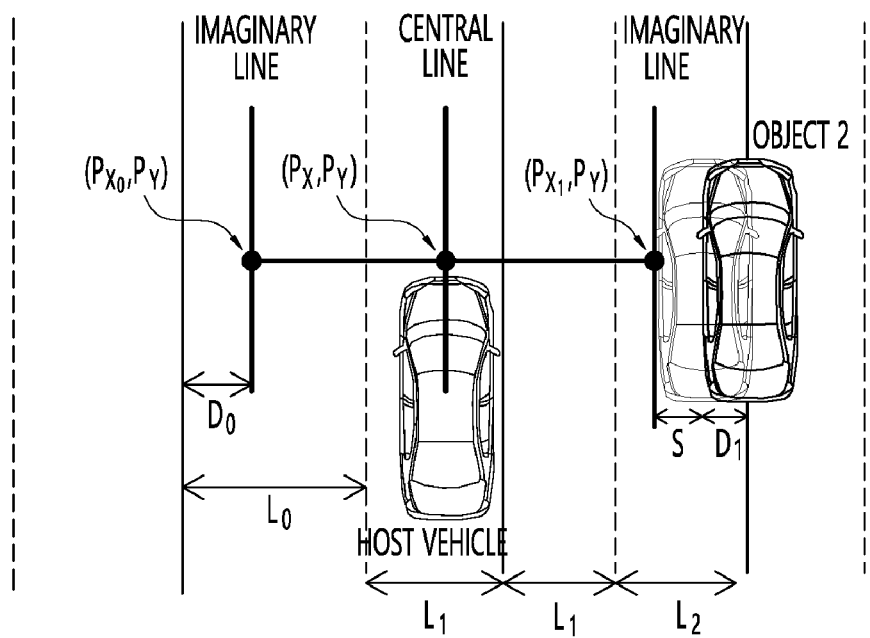
FIG. 6 illustrates a conventional method of obtaining imaginary lines and a central line when a vehicle is present at only one side of a host vehicle.

FIG. 6 illustrates a conventional method of obtaining imaginary lines and a central line when a vehicle is present at only one side of the host vehicle.

Referring to FIG. 6, when the vehicle (object 2) is present at only the right side of the host vehicle, the left imaginary line of the host vehicle is set to be a point moved rightwards from the central line (or the lane link) of the left lane by the width of the imaginary object 1 on the assumption that the vehicle (object 1) drives along the central line in the lane at the left side of the host vehicle, in conventional art. The center between the left imaginary line set as described above and the right imaginary line set as shown in FIG. 5 is defined as a corrected link lane of the host vehicle as represented by Mathematical expression 2.

$$P_X = \frac{P_{X_0} + P_{X_1}}{2} = \frac{(-L_1 - L_0 + D_0 + S_0) + (L_1 + L_2 - D_1 - S_1)}{2} = \frac{(L_2 - L_0) + (-S)}{2} \quad (\because D_0 = D_1, \ S_0 = 0, \ S_1 = S)$$

In the imaginary line of the left lane determined by Mathematical expression 2, however, the fact that no vehicle is present in the left lane is simply reflected.

In the present disclosure, when no vehicle is present in a lane at one side, the lane width of the lane having no vehicle is changed in consideration of curvature and shape of the lane having no vehicle, risk of the vehicle (object 2) located at the other side, host vehicle location recognition accuracy, and driving style of the host vehicle driver, whereby a contact accident with the right vehicle (object 2) that is actually present is minimized in consideration of the left vehicle (object 1) that is actually absent.

Figure 7:
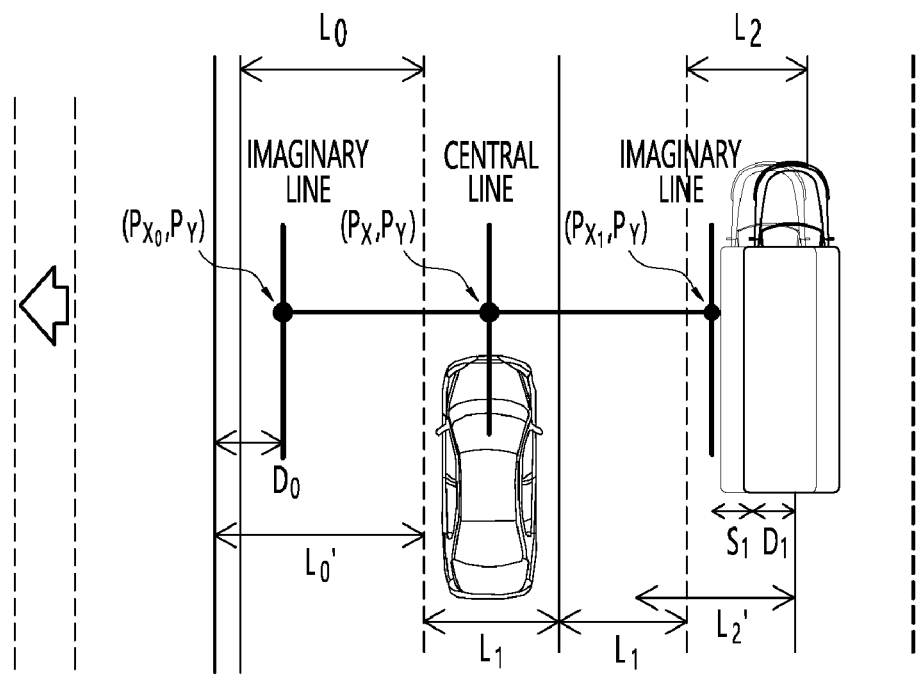
FIG. 7 illustrates a method according to the present disclosure of obtaining an imaginary line and a central line when a vehicle is present at only one side of a host vehicle.

FIG. 7 illustrates a method according to the present disclosure of obtaining imaginary lines and a central line when a vehicle is present at only one side of the host vehicle.

Referring to FIG. 7, when no vehicle is present in the left lane, it is sufficient to consider the number of cases in which interference with the right vehicle occurs. Consequently, the lane width of the left lane is arbitrarily increased to minimize interference with the right vehicle. That is, since no vehicle drives in the left lane, the central line (lane link) of the host vehicle is moved further toward the left lane than in the conventional method in order to maintain sufficient distance between the host vehicle and the right vehicle.

Since the lane width of the lane having no vehicle is arbitrarily adjusted, the position of the central line of the lane is changed in proportion to variation of the lane width. Since the position of the imaginary line of the left lane is changed, the position of the central line is also changed, and therefore a biased value of the vehicle is also affected.

A new lane link of the host vehicle considering the left lane, the lane width of which is changed, may be represented by Mathematical expression 3.

[Mathematical expression 3]

$$P_X = \frac{P_{X_0} + P_{X_1}}{2} = \frac{(L_1 + L_2 - D_1 - S_1)}{2} = \frac{(-L_1 - L_0' + 0 + D_0) + (L_2 - L_0') + (D_0 - D_1) + (0 - S_1)}{2}$$

Referring to Mathematical expression 3, parameters that affect the position of the imaginary line are the lane width $L_0'$, the width $D_0$ of the imaginary vehicle, and offset $L_2-L_0'$ of the imaginary vehicle, and therefore it can be seen that it is possible to change the lane width if the concept of the imaginary vehicle is excluded.

In the above description, the lane width is changed in order to change the position of the imaginary line. However, a method of changing the imaginary line is not limited thereto. In particular, it is possible to change the position of the imaginary line by using the concept of the imaginary vehicle and changing the width and offset of the imaginary vehicle.

For example, factors considered when changing the width of the lane having no vehicle may include risk, location recognition accuracy, driving style of the host vehicle driver, road curvature, and road shape.

The term "risk" refers to accident risk based on the type and size of the vehicle, i.e., the right vehicle. When driving in a state of being closer to a dangerous vehicle, the driver may generally be more greatly threatened. Consequently, it is preferable to reflect risk when creating an imaginary line of the lane having no vehicle.

Figure 8:
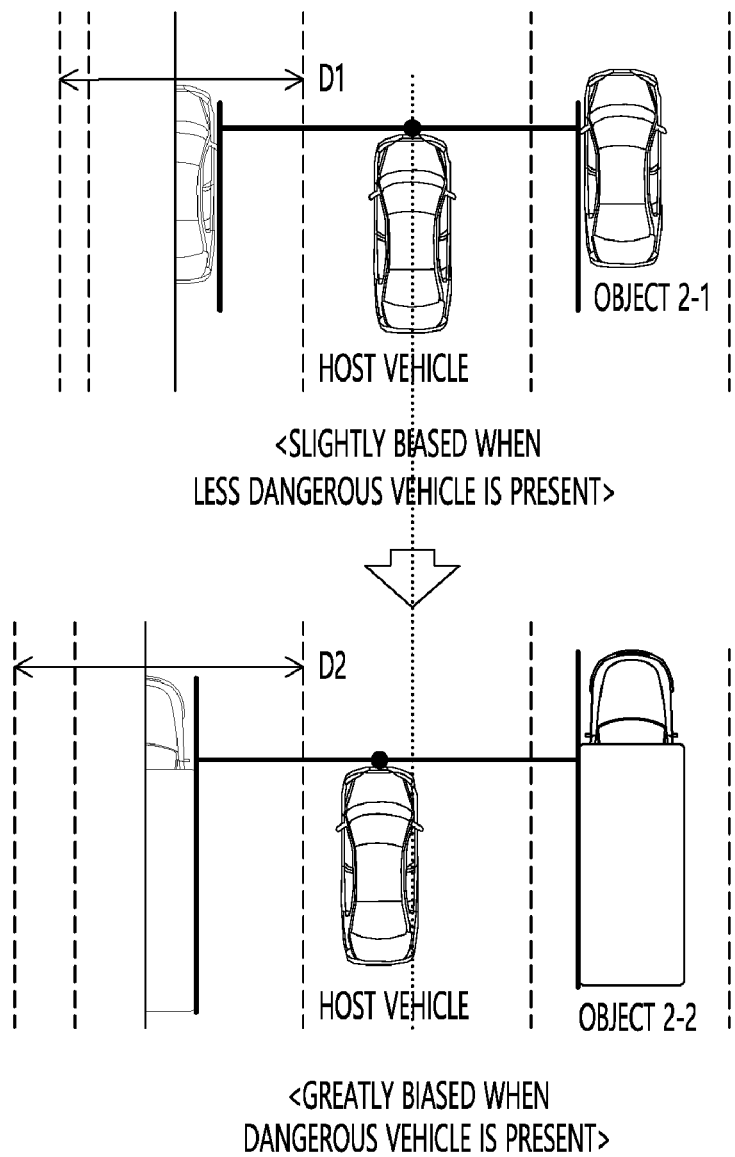
FIG. 8 illustrates a method of reflecting risk when the object imaginary line extraction module sets an imaginary line.

FIG. 8 illustrates a method of reflecting risk when the object imaginary line extraction module sets an imaginary line.

Referring to FIG. 8, it can be seen that the object imaginary line extraction module 262 may reflect risk when creating an imaginary line of an object and that the position of an imaginary line of a left object is changed depending on the type and size of a right vehicle. A sense of threat from a nearby vehicle to the host vehicle driver is changed depending on the type of the nearby vehicle. For example, when the nearby vehicle is a bus, a construction vehicle, a truck, or a two-wheel vehicle, the host vehicle driver is much more greatly threatened and drives more carefully than when the nearby vehicle is a small vehicle or a car having the same size.

It is assumed that a plurality of lanes installed side by side so as to extend in the same direction has the same width and that no vehicle is present in the left lane and a vehicle is present in the right lane based on the host vehicle. In this case, when setting the driving route of the host vehicle, the width of the left lane is arbitrarily increased such that the driving route of the host vehicle, i.e., the lane link of the host vehicle, is biased further toward the left lane depending on the type and size of the vehicle in the right lane, whereby a contact accident between the host vehicle and the right vehicle is prevented.

Referring to the upper part of FIG. 8, when a vehicle (object 2-1) in the right lane is a less dangerous vehicle, such as a car, the width of the left lane is set to D1. Referring to the lower part of FIG. 8, when a vehicle (object 2-2) in the right lane is a dangerous vehicle, such as a cargo truck, the width of the left lane is set to D2. Here, D1<D2.

Referring to FIG. 8, it can be seen that the width of the lane is slightly biased when a less dangerous vehicle is present while the width of the lane is greatly biased when a dangerous vehicle is present.

The reason that great biasing is set when such a dangerous vehicle is present is that it is possible to secure redundancy against autonomous driving control malfunction as well as stable driving and ride comfort.

FIG. 9 illustrates a method of reflecting location recognition accuracy when the object imaginary line extraction module sets an imaginary line.

Referring to FIG. 9, the object imaginary line extraction module 262 may reflect location recognition accuracy when creating an imaginary line of an object. When location recognition is incorrect, the distance from a vehicle in the next lane is increased in order to secure redundancy against incorrect determination of autonomous driving determination logic. When vehicles are present in both side lanes, the lane width of either lane is not changed, and therefore there is no problem in driving of the host vehicle. When a vehicle is present in only the right lane and location recognition of the host vehicle or the right vehicle is incorrect, as shown in FIG. 9, the width of the left lane is changed as wide as possible such that the final imaginary line is moved toward the left lane. That is, the extent of inaccuracy in location recognition of the host vehicle or the right vehicle is proportional to the changed width of the lane.

D1 when slightly biased is narrower than D2 when greatly biased (D1<D2), in the same manner as in FIG. 8.

FIG. 10 illustrates a method of reflecting driving style of the host vehicle driver when the object imaginary line extraction module sets an imaginary line.

Referring to FIG. 10, the object imaginary line extraction module 262 may reflect driving style of the host vehicle driver when creating an imaginary line of an object, and learns road phenomenon and object information, driver information, and a final biased value at the time of manual driving. After learning is completed, variation of the lane width to derive the learned final biased value in a situation similar to the learned situation may be set as a basic offset, and an additionally calculated offset may be summed.

For example, when driving in parallel to a car in the right lane, an offset to change the width of the left lane by 20 cm in the same situation may be basically applied to a driver who drives having a biased value D1 of 10 cm.

In the case in which the width of the lane is further changed by 10 cm by reflecting location recognition accuracy in the same situation, the width of the lane is changed by a total of 30 cm, and therefore a biased value D2 of 15 cm is provided.

Figure 11:
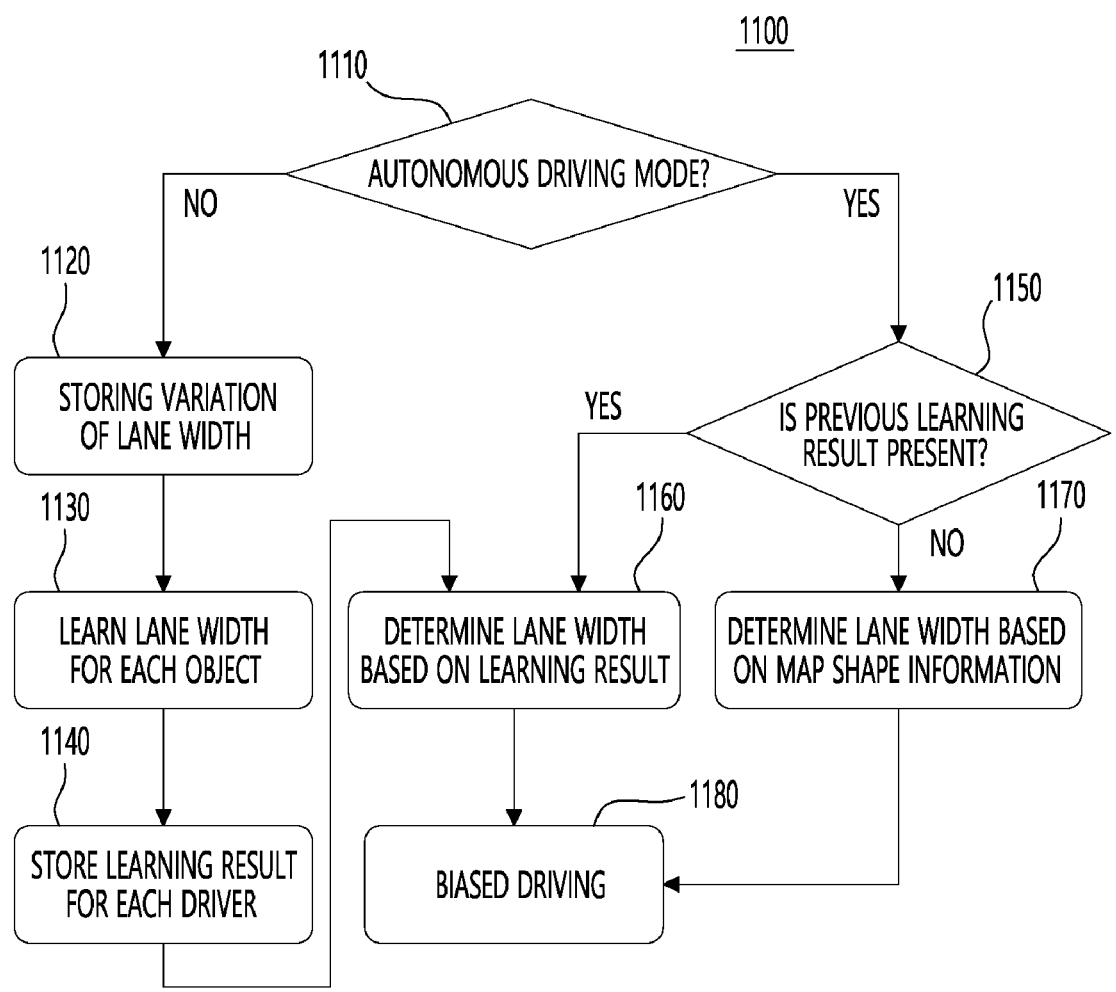
FIG. 11 illustrates a method of reflecting driving style of a host vehicle driver when the object imaginary line extraction module determines a lane width.

FIG. 11 illustrates a method of reflecting driving style of the host vehicle driver when the object imaginary line extraction module determines a lane width.

Referring to FIG. 11, the method (1100) of reflecting driving style of the host vehicle driver includes a step (1110) of determining whether the host vehicle is currently driving in an autonomous driving mode, steps (1120 to 1140) of learning and storing driving style for each driver upon determining that the host vehicle is not driving in the autonomous driving mode (No of 1110), and steps (1150 to 1180) of performing biased driving based on results of execution in the steps (1120 to 1140) of learning and storing driving style for each driver and map shape information upon determining that the host vehicle is driving in the autonomous driving mode (Yes of 1110).

The steps (1120 to 1140) of learning and storing driving style for each driver include a step (1120) of storing variation of a lane width of a lane near a lane in which the host vehicle is currently driving, a step (1130) of learning a lane width for each object, and a step (1140) of storing a learning result for each driver.

The steps (1150 to 1180) of performing biased driving include a step (1150) of determining whether a previous learning result is present, a step (1160) of comparing the learning result for each driver stored in the steps (1120 to 1140) of learning and storing driving style for each driver with the current situation to determine a lane width upon determining that the previous learning result is present (Yes of 1150), a step (1170) of determining a lane width using map shape information upon determining that no previous learning result is present (No of 1150), and a step (1180) of performing biased driving using the lane widths determined in the steps (1160 and 1170) of determining the two lane widths.

Referring to FIG. 11, the biased driving system 200 according to the present disclosure is capable of learning driving habits of a driver through the final biased value based on information of each object and a nearby road shape in a manual mode, not the autonomous driving mode, and is capable of outputting a final biased value as a learning result so as to be used for biasing using a nearby road shape and object information as input when a previously learned model is present in the autonomous driving mode.

In addition, when no previously learned model is present in the autonomous driving mode (an initialized state or a driver switching state), determination of a lane width based on map shape information may be performed without offset. When the previously learned model is present in the autonomous driving mode, the lane width is determined based on the learning result, whereby an offset is present at the position of an imaginary line, and the final lane width and the imaginary line are determined based on the map shape information by reflecting the offset such that biased driving is performed.

Figure 12:
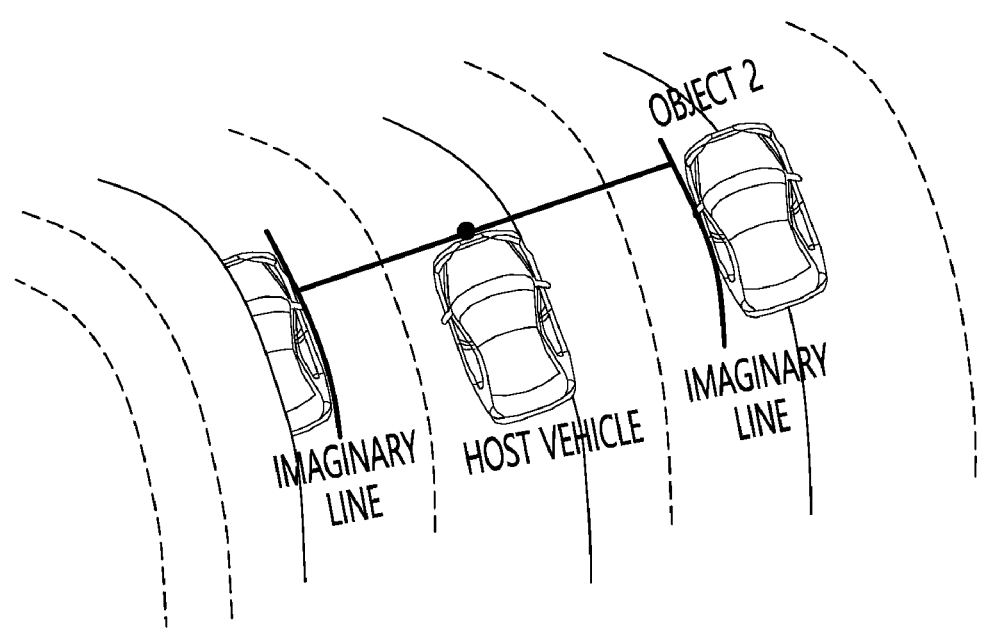
FIG. 12 illustrates a method of reflecting road curvature when the object imaginary line extraction module sets an imaginary line.

FIG. 12 illustrates a method of reflecting road curvature when the object imaginary line extraction module sets an imaginary line.

Referring to FIG. 12, the object imaginary line extraction module 262 may reflect road curvature when creating an imaginary line of an object. Upon determining that the road is curved, biasing is added in a direction toward a centripetal point, not the center of the lane of the host vehicle, whereby driving stability is improved.

The biased value is set so as to be proportional to the road curvature such that a control margin of centrifugal force is provided through greater biasing with increasing road curvature.

For example, when the curvature has a positive value, i.e., the host vehicle turns left, as shown in FIG. 12, an offset having a positive value, i.e., a left offset, is added to an imaginary line. When the curvature has a negative value, i.e., the host vehicle turns right, an offset having a negative value, i.e., a right offset, is added to an imaginary line.

FIG. 13 illustrates a method of reflecting road shape when the object imaginary line extraction module sets an imaginary line.

Referring to FIG. 13, the object imaginary line extraction module 262 may reflect road shape when creating an imaginary line of an object. Here, the road shape may be an intersection or a merging section, and additional biasing is reflected for a vehicle (object 2) entering in a direction toward the host vehicle lane in such a special section.

In general, the entering vehicle (object 2) drives based on the road shape of an access road or enters in a form similar to the road shape. Consequently, the road shape of the access road is reflected in a biased value. In order to reflect the road shape, the lane shape of an access lane is reflected in the lane width of an opposite lane when changing the lane width, whereby it is possible to easily create a biased route having the same reflected therein.

The red straight line of the left of the upper part of FIG. 13 reflects the shape of an access road in a merging section, and the red curved line of the left of the lower part of FIG. 13 reflects the shape of an access road at an intersection.

Figure 14:
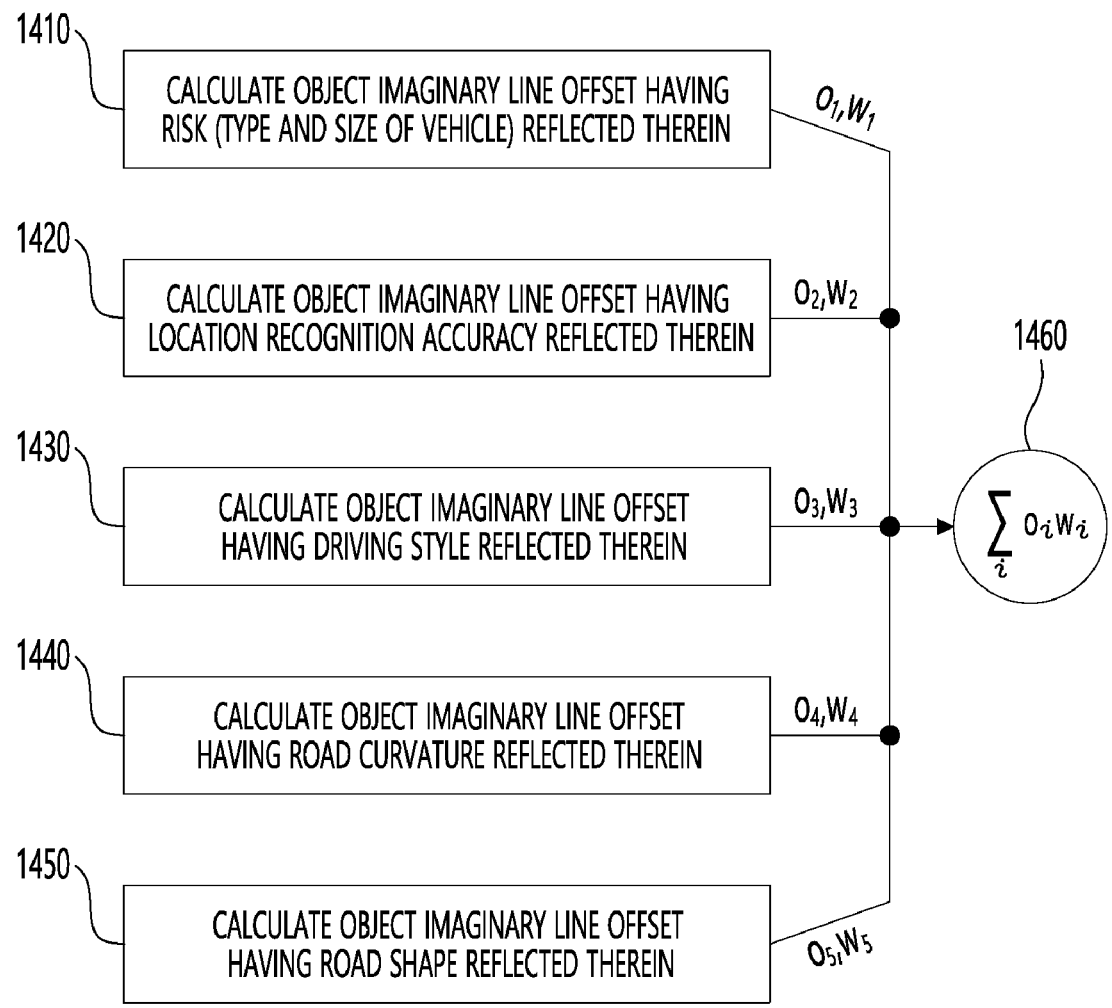
FIG. 14 shows an example of a final imaginary line determination method.

FIG. 14 shows an example of a final imaginary line determination method.

Referring to FIG. 14, it can be seen that an offset calculated by reflecting risk (1410), location recognition accuracy (1420), driving style of a driver (1430), road curvature (1440), and road shape (1450) and weights thereof may be gathered (1460) and a final imaginary line may be determined by reflecting the same.

The offset of the imaginary line may be determined by assigning weights so as to be proportional to importance of each element and performing weight sum calculation. A method of experimentally determining weights through parameter tuning or a method of assigning a compensation function and determining a parameter that maximizes the compensation function through repetitive feedback loop circulation may be applied as a weight determination method.

In FIG. 14, five calculation results are gathered together. However, an embodiment in which at least one thereof is reflected may be implemented.

Figure 15:
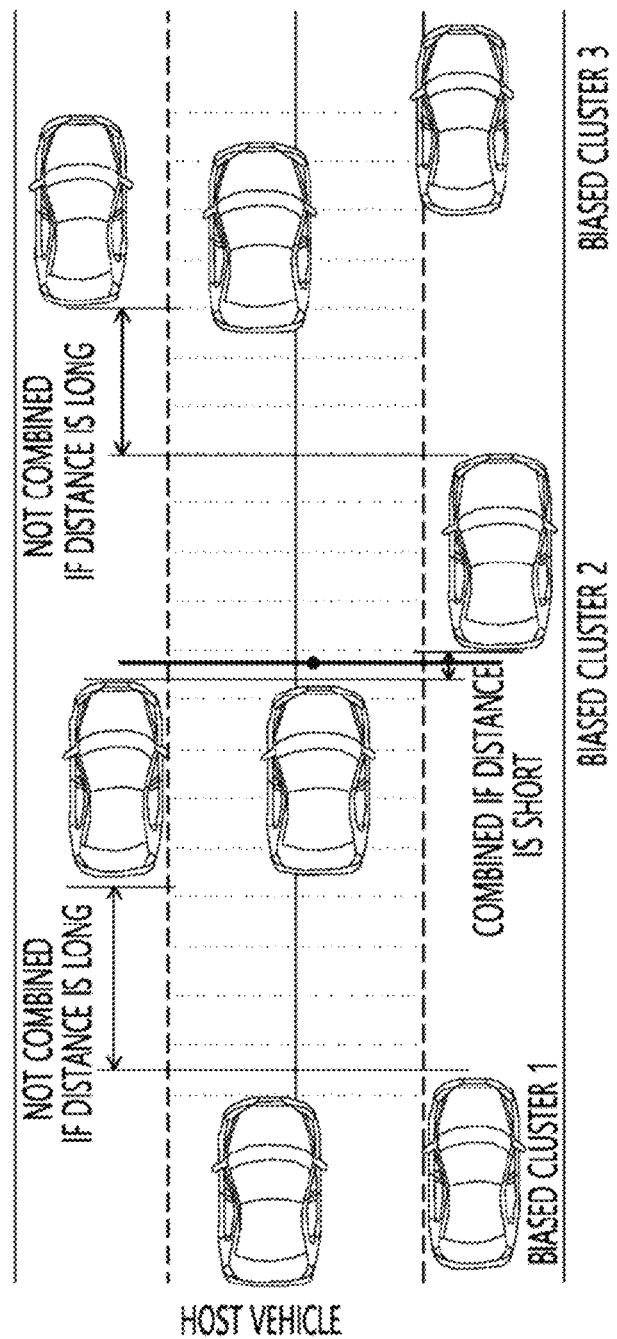
FIG. 15 illustrates an embodiment of clustering performed by a biased object clustering module.

FIG. 15 illustrates an embodiment of clustering performed by the biased object clustering module.

Referring to FIG. 15, the biased object clustering module 263 groups several objects into one in order to minimize creation of an unnatural biased route when the host vehicle calculates the biased value of each object. The distance between vehicles is used as a criterion for grouping.

That is, as will be described below, grouping is performed when the distance between biased objects is less than a critical distance.

When an N-th biased object and an (N+1)-th biased object are present within a critical distance T(m), the two objects are grouped into a single object.

When the (N+1)-th biased object and an (N+2)-th biased object are present within the critical distance T(m), the N-th, (N+1)-th, and (N+2)-th objects are grouped into a single object.

In the above method, clustering may be repeatedly performed up to a total of N_max, and N_max may be extended to the total number of biased objects.

When a final biased route is determined in the above situation, a central line between an imaginary line of the left lane closest to the host vehicle lane and an imaginary line of the right lane closest to the host vehicle lane in the cluster may become a component.

Figure 16:
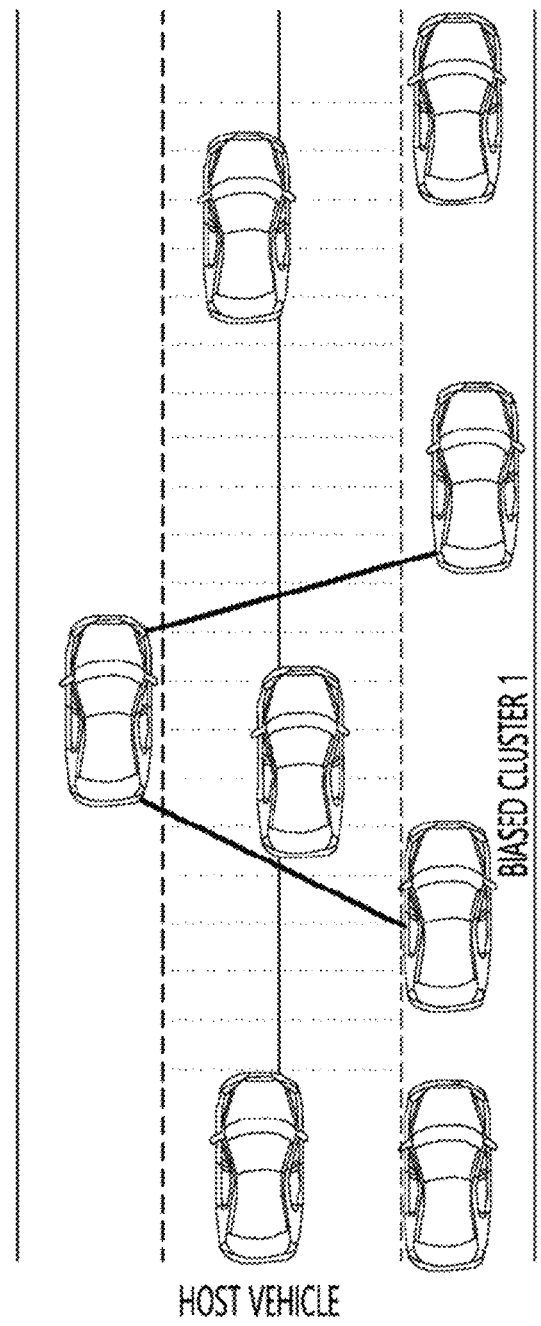
FIG. 16 illustrates another embodiment of clustering performed by the biased object clustering module.

FIG. 16 illustrates another embodiment of clustering performed by the biased object clustering module.

Referring to FIG. 16, the biased object clustering module 263 groups several objects into one when the host vehicle calculates the biased value of each object. Whether another vehicle zigzags is used as another criterion for grouping.

That is, as will be described below, when a plurality of other vehicles (objects) driving in zigzags is present, these vehicles are grouped into one.

When an N-th biased object and an (N+1)-th biased object are present respectively in a left lane and a right lane based on the host vehicle lane, the two objects are grouped into a single cluster.

When the (N+1)-th biased object and an (N+2)-th biased object are present respectively in the left lane and the right lane based on the host vehicle lane, the N-th, (N+1)-th, and (N+2)-th objects are grouped into a single cluster.

In the above method, clustering may be repeatedly performed up to a total of N_max, and N_max may be extended to the total number of biased objects.

When a final biased route is determined in the above situation, a central line between an imaginary line of the left lane closest to the host vehicle lane and an imaginary line of the right lane closest to the host vehicle lane in the cluster may become a component.

Figure 17:
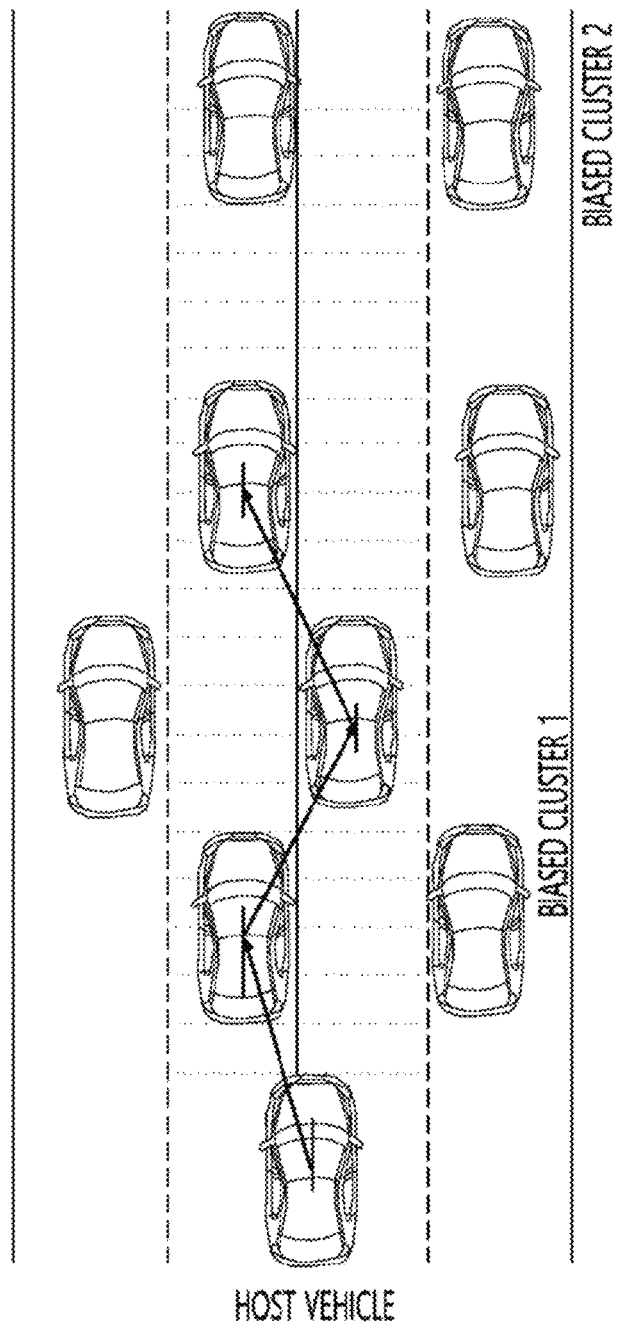
FIG. 17 illustrates a further embodiment of clustering performed by the biased object clustering module.

FIG. 17 illustrates a further embodiment of clustering performed by the biased object clustering module.

Referring to FIG. 17, the biased object clustering module 263 groups several objects into one when the host vehicle calculates the biased value of each object. Expected lateral speed of the host vehicle is used as a further criterion for grouping.

That is, as will be described below, when the expected lateral speed of the host vehicle is expected to be higher than a critical speed, a plurality of other vehicles (objects) corresponding thereto is grouped into one.

When the expected lateral speed of the host vehicle is higher than the critical speed for each of an N-th biased object and an (N+1)-th biased object, the two objects are grouped into a single cluster.

When the expected lateral speed of the host vehicle is higher than the critical speed for each of the (N+1)-th biased object and an (N+2)-th biased object, the N-th, (N+1)-th, and (N+2)-th objects are grouped into a single cluster.

In the above method, clustering may be repeatedly performed up to a total of N_max, and N_max may be extended to the total number of biased objects.

When a final biased route is determined in the above situation, a central line between an imaginary line of the left lane closest to the host vehicle lane and an imaginary line of the right lane closest to the host vehicle lane in the cluster may become a component.

As biased clustering, one of the three methods may be used or two or more of the methods may be used in a complementarily combined state. The output of the biased object clustering module may be the total number of clusters or information of each cluster, and components of the cluster information may be the number of biased objects in the cluster, information of biased objects in the cluster (speed, location, map information, etc.), and imaginary line information.

Figure 18:
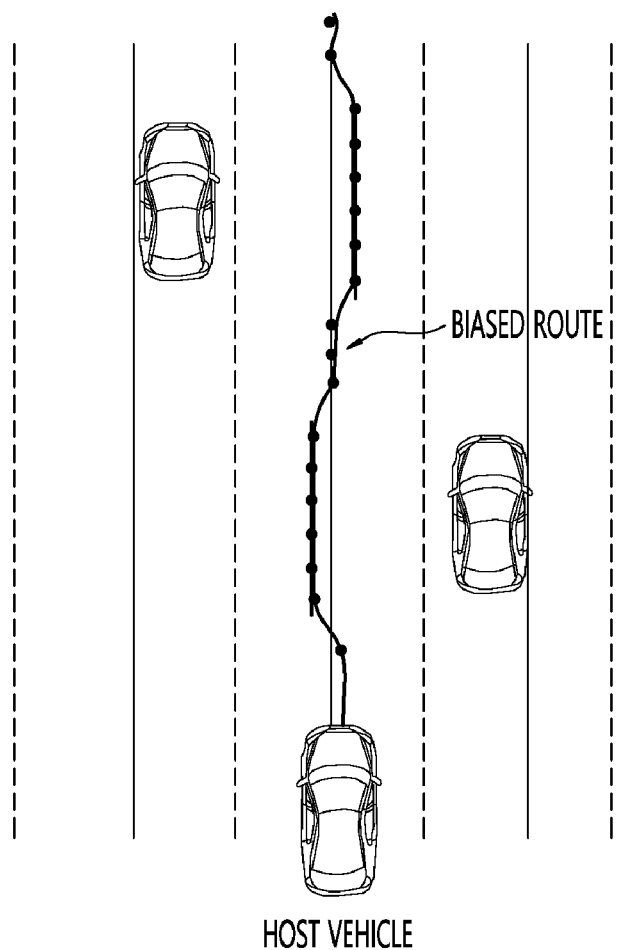
FIG. 18 illustrates a biased route created by a biased route creation module.

FIG. 18 illustrates a biased route created by the biased route creation module.

Referring to FIG. 18, it can be seen that the biased route created by the biased route creation module 264 may be a curved line that smoothly connects a central line between an imaginary line of the left lane closest to the host vehicle lane and an imaginary line of the right lane closest to the host vehicle lane in the cluster and a lane link to each other.

A method of connecting the central line between the imaginary lines and the lane link is not limited to a specific method, and the following methods may be used by way of example.

1. Control of uniform points constituting the central line between the imaginary lines and uniform points on the lane link Bezier curve constituted by points 2. Control of uniform points constituting the central line between the imaginary lines and uniform points on the lane link B-spline curve constituted by points 3. Control of uniform points constituting the central line between the imaginary lines and uniform points on the lane link NURBS constituted by points 4. Control of uniform points constituting the central line between the imaginary lines and uniform points on the lane link Cubic Spline Constituted by Points FIG. 19 shows an embodiment of a biased driving method according to the present disclosure.

Figure 19:
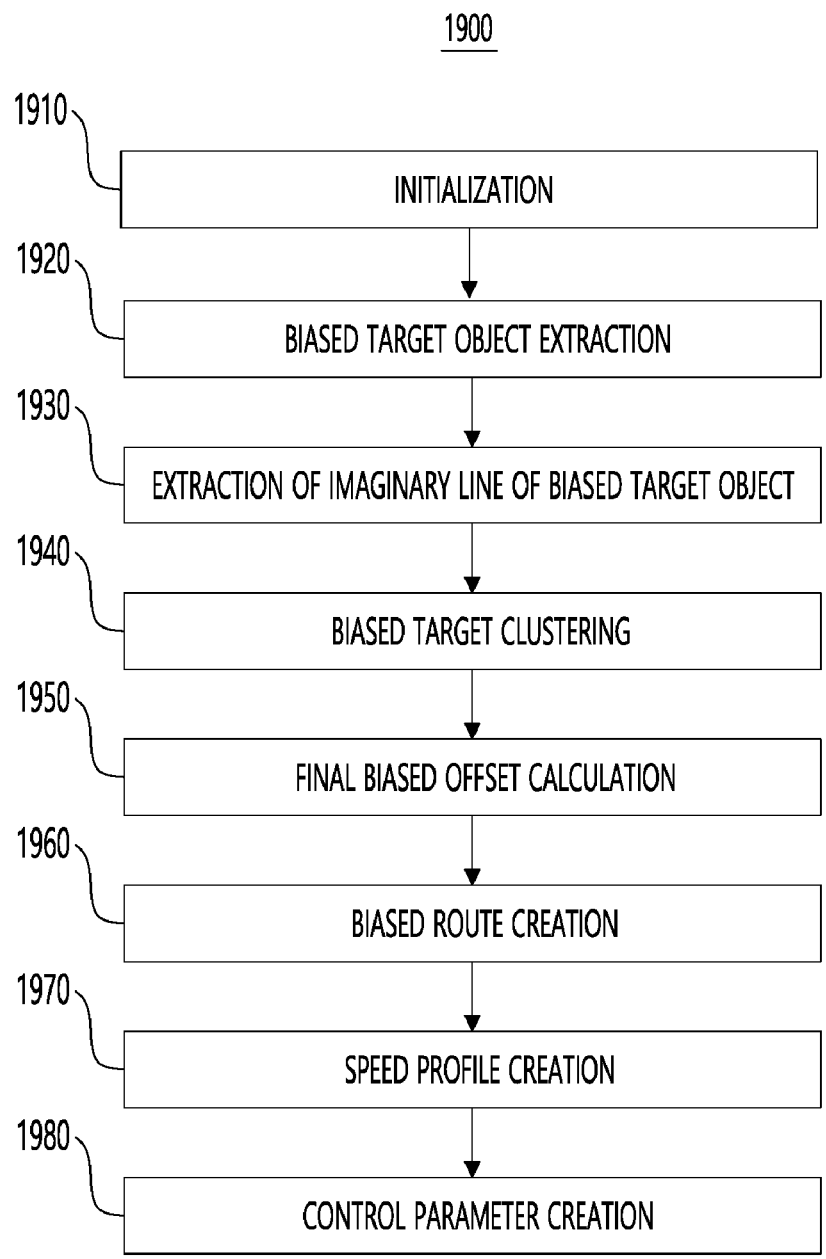
FIG. 19 shows an embodiment of a biased driving method according to the present disclosure.

Referring to FIG. 19, the biased driving method (1900) according to the present disclosure includes an initialization step (1910), a biased target object extraction step (S1920), a step (1930) of extracting an imaginary line of a biased target object, a biased target clustering step (1940), a final biased offset calculation step (1950), a biased route creation step (1960), a speed profile creation step (1970), and a control parameter creation step (1980).

The biased driving method (1900) shown in FIG. 19 is performed using the biased driving system 200 shown in FIGS. 1 and 2, and therefore only operation in each step will be briefly described.

In the initialization step (1910), the biased driving system 200 shown in FIG. 2 is initialized.

In the biased target object extraction step (1920), a biased target object is extracted based on a biased section.

In the step (1930) of extracting an imaginary line of a biased target object, a reference point and an imaginary line to be biased are extracted.

In the biased target clustering step (1940), objects that satisfy specific criteria, among biased objects near a host vehicle, are grouped.

In the final biased offset calculation step (1950), a biased offset is finally determined for each grouped cluster.

In the biased route creation step (1960), a route on a lane link having the offset reflected therein, i.e., a biased route becoming a guideline for driving, is created.

In the speed profile creation step (1970), a speed profile of the host vehicle that moves along the biased route is created.

In the control parameter creation step (1980), a control parameter having the biased route and the speed profile reflected therein is created.

Figure 20:
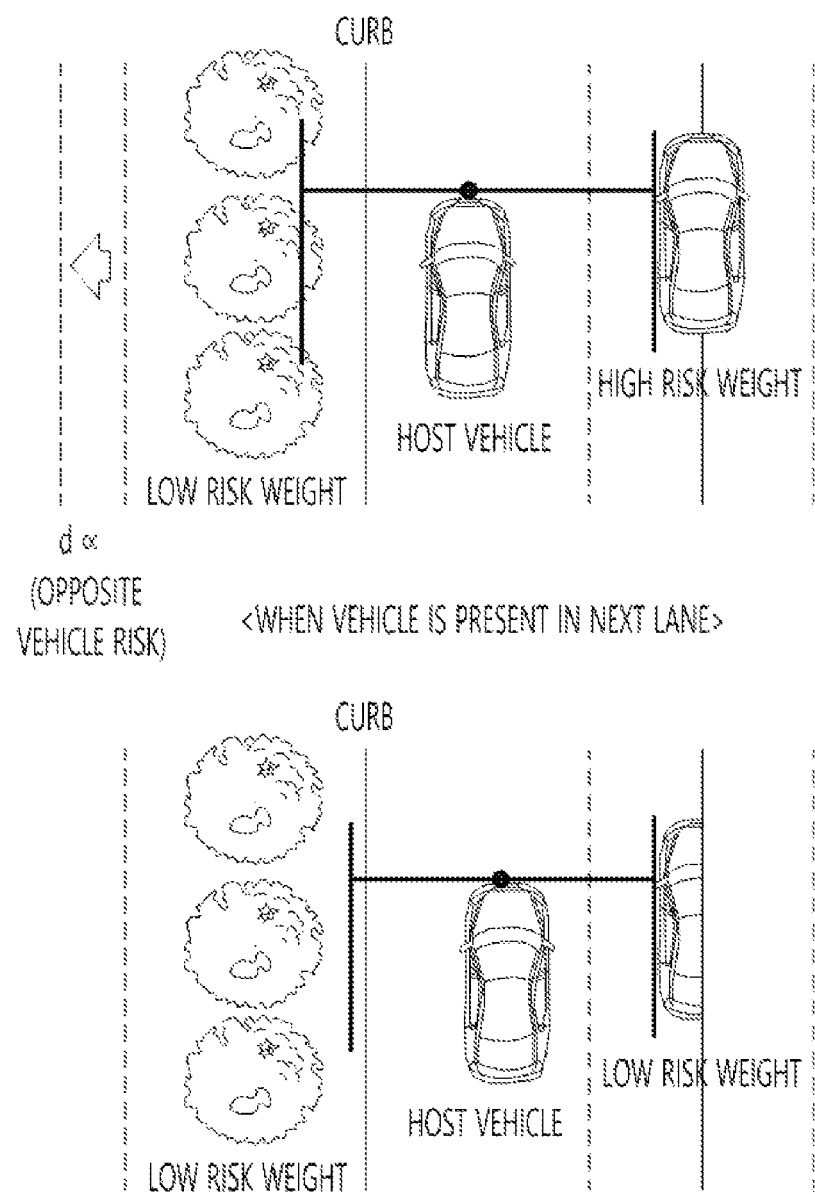
FIG. 20 illustrates an example of biasing depending on whether a vehicle is present in an opposite lane during end lane driving.

FIG. 20 illustrates an example of biasing depending on whether a vehicle is present in an opposite lane during end lane driving.

Referring to FIG. 20, in the case in which the host vehicle drives in a state of being adjacent to a grove or a guardrail during end lane driving, the driver may be threatened, whereby biased driving may be performed. In the case in which no vehicle is present in an opposite lane, a sufficient distance may be kept from the guardrail or the grove. In the case in which a vehicle is driving in the next lane, however, the host vehicle may drive along the center of the lane or may drive in a state of being biased from the vehicle. In such a situation, risk of static objects, such as the grove and the guardrail, and risk of the vehicle in the next lane may be assigned differently, which may be reflected in a biased value.

For example, variation in lane width may be proportional to risk of the opposite vehicle. As shown in the upper part of FIG. 20, therefore, greater risk than the grove occurs when a dangerous vehicle is present, and therefore the position of a final imaginary line may be biased to the side opposite the vehicle. When no vehicle is present, as shown in the lower part of FIG. 20, risk of the grove/guardrail is higher than the lane having no vehicle, and therefore the position of a final imaginary line may be biased to the side opposite the grove/guardrail.

Figure 21:
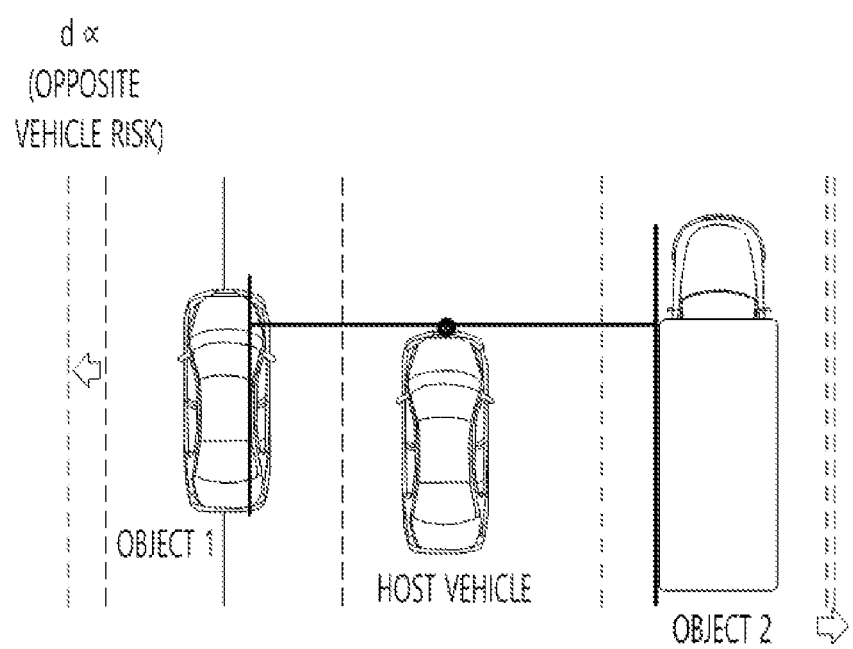
FIG. 21 illustrates an application example of the present disclosure in a situation in which a dangerous vehicle and a normal vehicle are mixed.

FIG. 21 illustrates an application example of the present disclosure in a situation in which a dangerous vehicle and a normal vehicle are mixed.

Referring to FIG. 21, when different types of vehicles are driving in both lanes during normal lane driving, there is a tendency in which biased driving is performed in a state of being spaced apart from a more dangerous vehicle by a sufficient distance. In such a situation, risk of a dangerous vehicle and risk of a relatively safe vehicle may be assigned differently, which may be reflected in a biased value.

For example, variation in lane width may be proportional to risk of the opposite vehicle. When a dangerous vehicle is present, therefore, the dangerous vehicle has higher risk than a normal vehicle, and therefore the position of a final imaginary line may be biased to the side opposite the dangerous vehicle, i.e., to the less dangerous vehicle. Since risk of a dangerous vehicle (a truck, a construction vehicle, a bus, etc.) is higher than risk of a normal vehicle, the position of a final imaginary line may be biased to the side opposite the dangerous vehicle.

The present disclosure shown in FIGS. 11, 14, and 19 described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, a biased driving system and a biased driving method according to the present disclosure have advantages in that it is possible to simply obtain a biased value for a vehicle driving in a lane adjacent to a lane of a host vehicle in a complicated aspect, it is possible to obtain a biased value having reliability using the same method even on a curved road, not a straight road, it is possible to secure driving stability and ride comfort since the host vehicle passes between contour lines of actual vehicles in consideration of vehicle type, location recognition accuracy, driving style of a driver, etc., and it is possible to reflect road shape and to apply the same to a section having a changed lane width, such as a merging lane, an intersection, or a tollgate.

It should be noted that the effects of embodiments are not limited to the effects mentioned above, and other unmentioned effects will be clearly understood by those skilled in the art from the above description.

While the technical idea of the present disclosure has been described with reference to the accompanying drawings, this illustratively describes preferred embodiments of the present disclosure, not restricts the present disclosure. In addition, a person having ordinary skill in the art to which the present disclosure pertains will appreciate that various modifications and alterations are possible without departing from the category of the technical idea of the present disclosure.

What is claimed is:

1. A biased driving system comprising:
a control parameter creation unit configured to extract an object causing biasing of a host vehicle using converged object information, which is map information comprising location and speed of a vehicle around the host vehicle, to create an imaginary line of the extracted object by reflecting a location recognition accuracy and optionally reflecting at least one of risk of a nearby vehicle, driving style of a driver of the host vehicle, road curvature, or road shape, and to create a control parameter using the imaginary line; and
a controller configured to create a control value of a vehicle corresponding to the control parameter received from the control parameter creation unit in order to control biasing of the host vehicle,
wherein the control parameter creation unit groups a plurality of objects, from each of which the imaginary line has been extracted, based on at least one of a distance between vehicles, whether another vehicle zigzags, or expected lateral speed of the host vehicle and creates the control parameter using the plurality of grouped objects,
wherein the control parameter creation unit calculates an offset of each group, creates a biased route by reflecting the calculated offset, creates a speed profile corresponding to the biased route, and creates the control parameter by reflecting the biased route and the speed profile,
wherein the control parameter creation unit comprises:
a biased target object extraction module configured to extract a biased target object causing biasing of the host vehicle, among the plurality of objects included in the converged object information;
an object imaginary line extraction module configured to extract an imaginary line of the biased target object causing biasing of the host vehicle and to extract a central line of the host vehicle using the extracted imaginary line of the biased target object;
a biased object clustering module configured to create biased cluster information grouping biased target objects based on the imaginary line of the biased target object and based on at least one of the distance between vehicles, whether the other vehicle zigzags, or the expected lateral speed of the host vehicle;
a biased route creation module configured to create a biased route, which is a set of final biased values, using the biased cluster information;
a speed profile creation module configured to create speed profile information comprising the biased route and host vehicle speed information matched with road traffic situation;
a driving route information creation module configured to create driving route information comprising the biased route and the speed profile information; and
a control parameter creation unit configured to create the control parameter corresponding to the driving route information,
wherein the imaginary line of the biased target object is an imaginary straight line or curved line parallel to the host vehicle lane based on a closest point between an outermost point of a target object and the host vehicle, and
wherein the location recognition accuracy comprises at least one of location recognition accuracy of the host vehicle or location recognition accuracy of the nearby vehicle.

2. The biased driving system according to claim 1, wherein the object causing biasing of the host vehicle is a vehicle that has approached within a predetermined biased section.

3. The biased driving system according to claim 1, wherein the biased cluster information comprises a number of clusters and information of each of the clusters.

4. The biased driving system according to claim 1, wherein the biased route is a line that connects a central line between an imaginary line of a left lane closest to the host vehicle lane and an imaginary line of a right lane closest to the host vehicle lane and a lane link to each other.

5. The biased driving system according to claim 1, wherein the object imaginary line extraction module creates the imaginary line differently when objects are present at both sides of the host vehicle and when an object is present at only one side of the host vehicle.

6. The biased driving system according to claim 5, wherein the risk is classified based on type and size of the nearby vehicle or based on magnitude of a sense of threat that the driver of the host vehicle feels from the nearby vehicle.

7. The biased driving system according to claim 1, wherein the road shape indicates that a road is an intersection or a merging section, or that the road is a straight road or a curved road.

8. The biased driving system according to claim 1, further comprising a biased object information creation unit configured to create the converged object information.

9. The biased driving system according to claim 8, wherein the biased object information creation unit comprises:
a location recognition module configured to compare recognition information received from outside, current location information of the host vehicle, and a precise map around the host vehicle with each other in order to create current precise location information of the host vehicle;
a road information convergence module configured to create a precise map around the host vehicle using the current precise location information of the host vehicle and the precise map; and
an object convergence module configured to create the converged object information using the precise map around the host vehicle and the recognition information, and
the recognition information comprises a driving road of the host vehicle, surrounding information of the driving road of the host vehicle, and information about a vehicle around the driving road of the host vehicle.

10. A biased driving system comprising:
a control parameter creation unit configured to extract an object causing biasing of a host vehicle using converged object information, which is map information comprising location and speed of a vehicle around the host vehicle, to create an imaginary line of the extracted object by reflecting a driving style of a driver of the host vehicle and optionally reflecting at least one of risk of a nearby vehicle, location recognition accuracy, road curvature, or road shape, and to create a control parameter using the imaginary line; and
a controller configured to create a control value of a vehicle corresponding to the control parameter received from the control parameter creation unit in order to control biasing of the host vehicle,
wherein the control parameter creation unit groups a plurality of objects, from each of which the imaginary line has been extracted, based on at least one of a distance between vehicles, whether another vehicle zigzags, or expected lateral speed of the host vehicle and creates the control parameter using the plurality of grouped objects,
wherein the control parameter creation unit calculates an offset of each group, creates a biased route by reflecting the calculated offset, creates a speed profile corresponding to the biased route, and creates the control parameter by reflecting the biased route and the speed profile,
wherein the control parameter creation unit comprises:
a biased target object extraction module configured to extract a biased target object causing biasing of the host vehicle, among the plurality of objects included in the converged object information;
an object imaginary line extraction module configured to extract an imaginary line of the biased target object causing biasing of the host vehicle and to extract a central line of the host vehicle using the extracted imaginary line of the biased target object;
a biased object clustering module configured to create biased cluster information grouping biased target objects based on the imaginary line of the biased target object and based on at least one of the distance between vehicles, whether the other vehicle zigzags, or the expected lateral speed of the host vehicle;
a biased route creation module configured to create a biased route, which is a set of final biased values, using the biased cluster information;
a speed profile creation module configured to create speed profile information comprising the biased route and host vehicle speed information matched with road traffic situation;
a driving route information creation module configured to create driving route information comprising the biased route and the speed profile information; and
a control parameter creation unit configured to create the control parameter corresponding to the driving route information,
wherein the imaginary line of the biased target object is an imaginary straight line or curved line parallel to the host vehicle lane based on a closest point between an outermost point of a target object and the host vehicle, and
wherein the driving style of the driver of the host vehicle is a habitual biasing extent of the driver of the host vehicle who drives in a state of being spaced apart from the vehicle around the host vehicle.

11. The biased driving system according to claim 10, wherein the object causing biasing of the host vehicle is a vehicle that has approached within a predetermined biased section.

12. The biased driving system according to claim 10, wherein the biased cluster information comprises a number of clusters and information of each of the clusters.

13. The biased driving system according to claim 10, wherein the biased route is a line that connects a central line between an imaginary line of a left lane closest to the host vehicle lane and an imaginary line of a right lane closest to the host vehicle lane and a lane link to each other.

14. The biased driving system according to claim 10, wherein the object imaginary line extraction module creates the imaginary line differently when objects are present at both sides of the host vehicle and when an object is present at only one side of the host vehicle.

15. The biased driving system according to claim 14, wherein the risk is classified based on type and size of the nearby vehicle or based on magnitude of a sense of threat that the driver of the host vehicle feels from the nearby vehicle.

16. A biased driving system comprising:
a control parameter creation unit configured to extract an object causing biasing of a host vehicle using converged object information, which is map information comprising location and speed of a vehicle around the host vehicle, to create an imaginary line of the extracted object by reflecting a road curvature and optionally reflecting at least one of risk of a nearby vehicle, location recognition accuracy, driving style of a driver of the host vehicle, or road shape, and to create a control parameter using the imaginary line; and
a controller configured to create a control value of a vehicle corresponding to the control parameter received from the control parameter creation unit in order to control biasing of the host vehicle,
wherein the control parameter creation unit groups a plurality of objects, from each of which the imaginary line has been extracted, based on at least one of a distance between vehicles, whether another vehicle zigzags, or expected lateral speed of the host vehicle and creates the control parameter using the plurality of grouped objects,
wherein the control parameter creation unit calculates an offset of each group, creates a biased route by reflecting the calculated offset, creates a speed profile corresponding to the biased route, and creates the control parameter by reflecting the biased route and the speed profile,
wherein the control parameter creation unit comprises:
a biased target object extraction module configured to extract a biased target object causing biasing of the host vehicle, among the plurality of objects included in the converged object information;
an object imaginary line extraction module configured to extract an imaginary line of the biased target object causing biasing of the host vehicle and to extract a central line of the host vehicle using the extracted imaginary line of the biased target object;
a biased object clustering module configured to create biased cluster information grouping biased target objects based on the imaginary line of the biased target object and based on at least one of the distance between vehicles, whether the other vehicle zigzags, or the expected lateral speed of the host vehicle;
a biased route creation module configured to create a biased route, which is a set of final biased values, using the biased cluster information;
a speed profile creation module configured to create speed profile information comprising the biased route and host vehicle speed information matched with road traffic situation;
a driving route information creation module configured to create driving route information comprising the biased route and the speed profile information; and
a control parameter creation unit configured to create the control parameter corresponding to the driving route information,
wherein the imaginary line of the biased target object is an imaginary straight line or curved line parallel to the host vehicle lane based on a closest point between an outermost point of a target object and the host vehicle, and
wherein a biased extent of the imaginary line of the biased target object is increased in proportion to the road curvature.

17. The biased driving system according to claim 16, wherein the object causing biasing of the host vehicle is a vehicle that has approached within a predetermined biased section.

18. The biased driving system according to claim 16, wherein the biased cluster information comprises a number of clusters and information of each of the clusters.

19. The biased driving system according to claim 16, wherein the biased route is a line that connects a central line between an imaginary line of a left lane closest to the host vehicle lane and an imaginary line of a right lane closest to the host vehicle lane and a lane link to each other.

20. The biased driving system according to claim 16, wherein the object imaginary line extraction module creates the imaginary line differently when objects are present at both sides of the host vehicle and when an object is present at only one side of the host vehicle.

21. The biased driving system according to claim 20, wherein the risk is classified based on type and size of the nearby vehicle or based on magnitude of a sense of threat that the driver of the host vehicle feels from the nearby vehicle.

* * * * *